United States Patent [19]
Gresho

[11] 3,780,442
[45] Dec. 25, 1973

[54] METHODS AND COMPOUND GAUGE DEVICES FOR MEASURING THE AXIAL CURVATURE OF A TUBE

[75] Inventor: William Milan Gresho, Hopewell Township, Mercer County, N.J.

[73] Assignee: Western Electric Company, Incorporated, New York, N.Y.

[22] Filed: Apr. 21, 1972

[21] Appl. No.: 246,210

[52] U.S. Cl. .............................. 33/178 E, 33/174 R
[51] Int. Cl. ... G01b 7/28, E21b 47/08, G01b 19/26
[58] Field of Search ..................... 33/174 R, 174 P, 33/174 PA, 178 R, 86, 178 E, 178 F, 1 H

[56] References Cited
UNITED STATES PATENTS

| | | | |
|---|---|---|---|
| 2,732,670 | 1/1956 | Foster | 33/178 E X |
| 3,323,216 | 6/1967 | Ublacker | 33/86 |
| 2,219,708 | 10/1940 | Kruse | 33/178 E X |
| 2,074,753 | 3/1937 | McClain | 33/178 E |
| 2,355,316 | 8/1944 | Mestas | 33/178 E X |
| 3,496,644 | 2/1970 | Short | 33/174 R |
| 3,571,937 | 3/1971 | Sears | 33/1 H X |

OTHER PUBLICATIONS

"Millimeter Waveguide and its Accessories," Nov., 1971, Catalogue TI-71029-Furukawa Electric Co., Ltd., Tokyo, Japan T. Nakahara, M. Hoshikawa, T. Fujiwara, "Straightness Deviation of Steel Pipe-Waveguide," Sumitomo Elec. Tech. Rev. No. 123-167, p. 57-64

Primary Examiner—John W. Huckert
Assistant Examiner—Milton S. Gerstein
Attorney—W. M. Kain et al.

[57] ABSTRACT

A number of wall curvature gauges, e.g., two, are mounted independently on a rigid carrier, arrayed equiangularly about the axis of the rigid carrier, to form a compound gauge device. The compound gauge is advanced along the length of a tube, typically through the interior of the tube, with each component gauge generating an electrical signal having a voltage representative of tube wall curvature along the path traced by the respective gauge. The signals are processed concurrently to provide a single continous output voltage signal which is proportional to a weighted algebraic sum of the voltages generated by the individual wall curvature gauges. Where two diametrically opposed wall curvature gauges are employed, the weighted algebraic sum constitutes the difference in signal voltages generated by the two gauges. The single continuous output signal is representative of the pattern of an axial curvature component in a plane along the length of the tube, e.g., the plane defined by two diametrically opposed wall curvature gauges.

35 Claims, 7 Drawing Figures

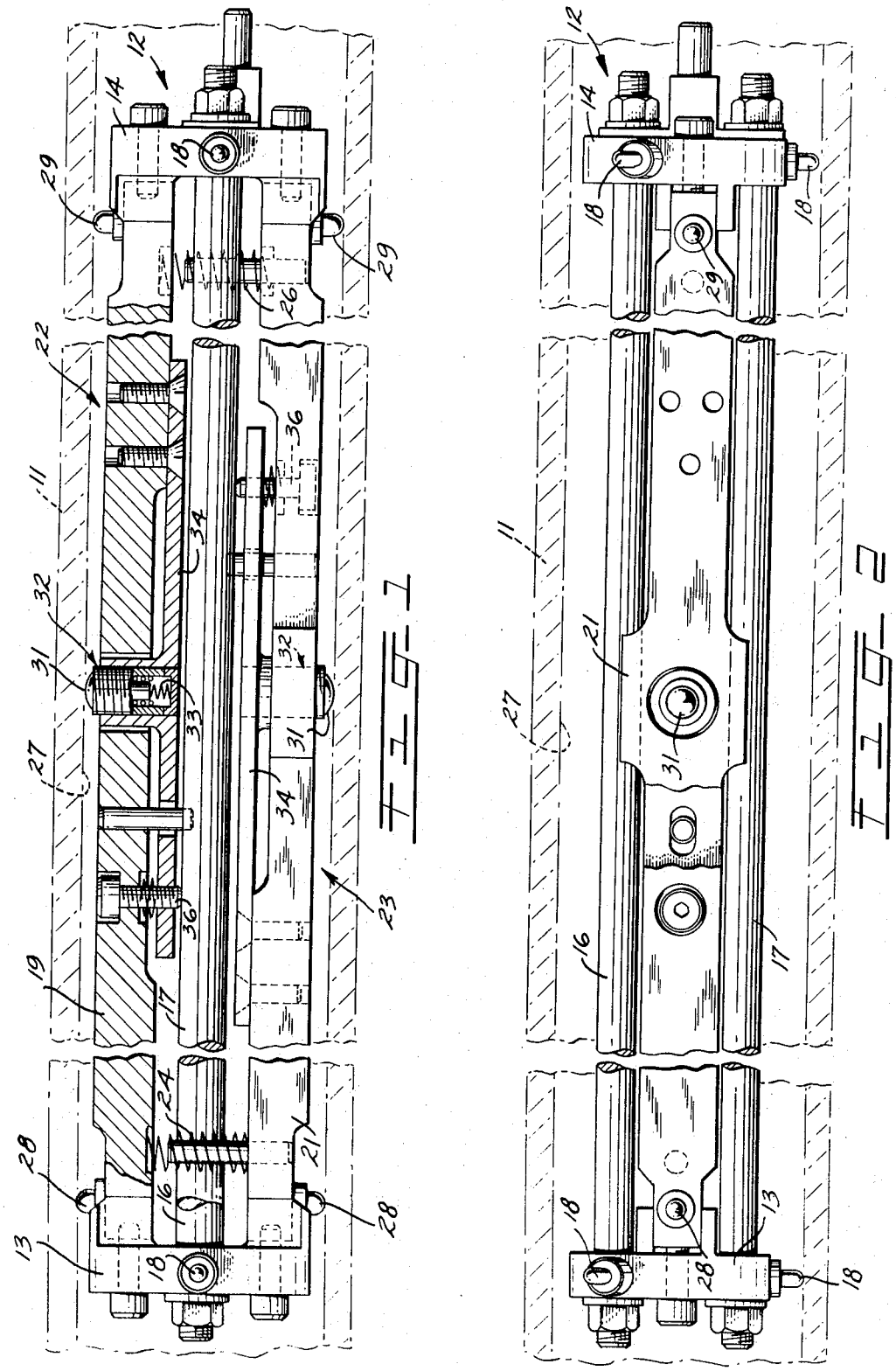

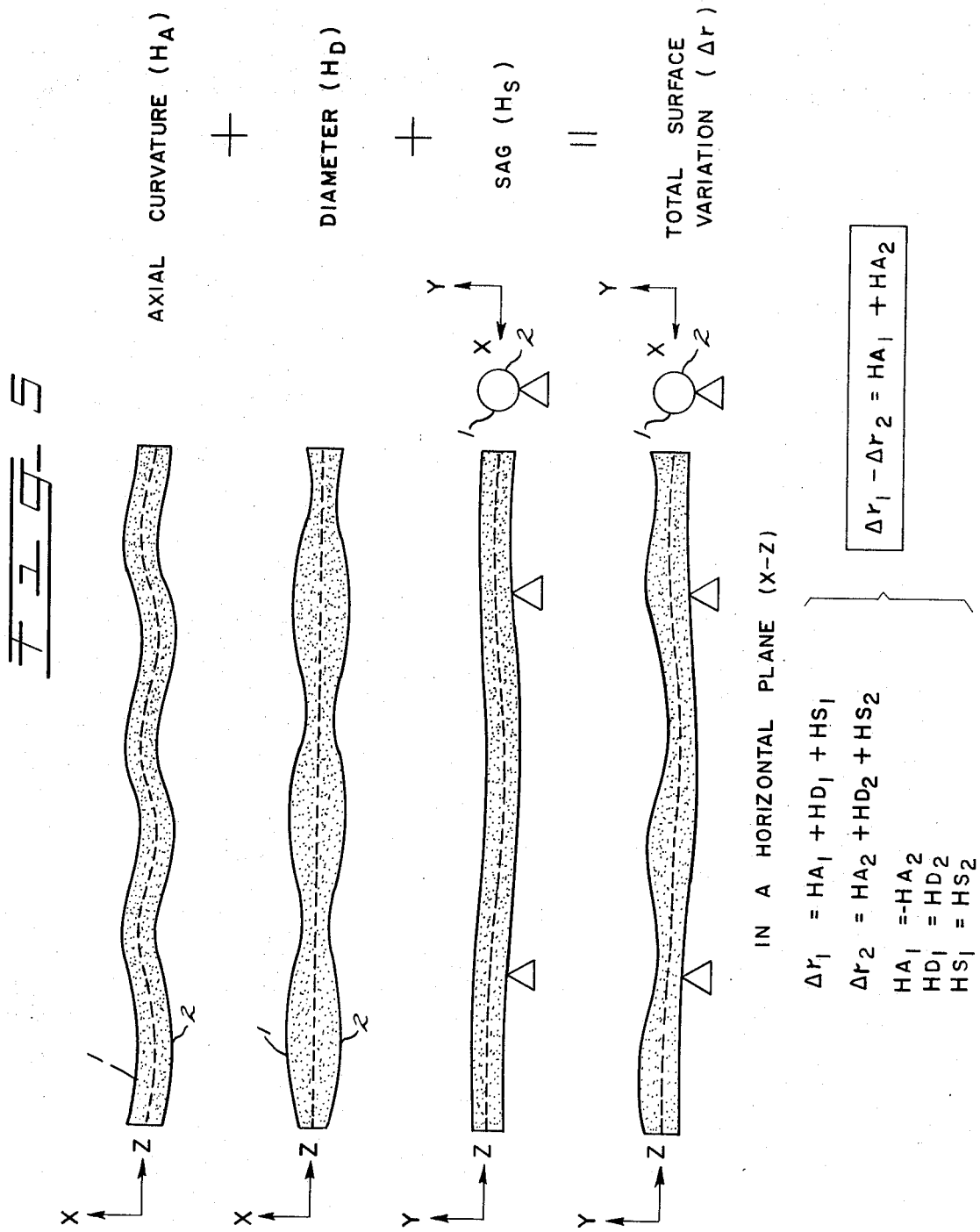

METHODS AND COMPOUND GAUGE DEVICES FOR MEASURING THE AXIAL CURVATURE OF A TUBE

RELATED APPLICATION

This patent application is closely related to a patent application by W. E. Rapp on Compound Gauge Devices for Measuring the Axial Curvature of a Tube, Ser. No. 246,372, filed on the same data as this application.

BACKGROUND OF THE INVENTION

This invention relates to methods and apparatus for measuring the axial curvature of a tube or other elongated member and, more particularly, to methods and apparatus for measuring the axial curvature of a tube or other elongated member by providing a single, real time indication of the axial curvature. Curvature is defined mathematically as the rate of change of direction of a path through space, in this case the axis of a tube, with respect to displacement along the path.

In the manufacture of certain tubes, e.g., in forming sections of waveguide tubing for use in transmitting millimeter wavelength communication signals, it may be necessary that the axial curvature of each section, i.e., the departure from perfect straightness, be minimal. A minimum radius of curvature of 2,500 feet is typically desired for waveguide tubes of approximately 2 inch inner diameter, with a root-mean-square average radius of curvature of at least 5,000 feet. Detailed, accurate measurement of the axial curvature of such tubes is, thus, necessary. Precise axial curvature measurement is, however, an involved undertaking, in that curvature ordinarily must be examined at a large number of points along the axis of a rather long secon of tubing, e.g., 5 or 10 meters long. The curvature examination should preferably be continuous, i.e., examination along an infinite number of points between the ends of each tube.

Measurement of the axial curvature of a tube has previously been accomplished by displacing a gauge, in one form or another, longitudinally through the tube being examined. One type of gauge which has been utilized consists of an elongated, flexible structure, contacting the inner wall of the tube at a number of locations along the length of the gauge. A taut wire stretches between forward and rearward ends of the structure to define a straight axis with reference to which the radial flexure of a portion of the structure is sensed electrically.

This type of flexible gauge, while useful in many applications, is considered not well suited to provide an extreme degree of accuracy, as required in testing sections of millimeter waveguide tubing. For very precise measurements to be made with such a gauge, the forward and the rearward ends of the wire would both have to be maintained continuously centered exactly on the axis of the tube, in spite of curvature in the tube and of any changes in tube diameter, for all longitudinal positions of the gauge. At the same time, the wire would have to be kept continuously taut without affecting the centering of the wire ends. Moreover, the position of the axis of the wire would have to be sensed, at a single known location along the length of the wire, with respect to a contacted point on the inner wall of the tube radially coplanar with the known location along the length of the wire. Practical problems in achieving these required conditions in this type of flexible gauge, so that axial curvature may be measured precisely and reliably, are formidable. No such gauge is known to be commercially available.

Another type of gauge has also been employed in attempting to ascertain the axial curvature pattern of a tube, the gauge providing measurements of the curvature of an inner wall of a tube undergoing testing. This wall curvature gauge (illustrated in FIG. 4 of the drawing) takes the form of a rigid carrier. A radially movable probe contacts the inner wall of the tube between two reference points established by wall-contacting elements at each end of the rigid carrier.

It was initially believed that a single pass of such a wall curvature gauge through a tube could provide an accurate indication of the axial curvature of the tube in the plane of the gauge. However, two such axial passes have since been found necessary to the examination of an axial curvature component in a plane.

By displacing the rigid carrier twice through the tube at diametrically opposite positions on the inner wall, wall curvature values may be obtained along two diametrically opposed, longitudinally extending lines on the inner wall. These values may be represented as two traces plotted on a common chart. To determine the axial curvature behavior in the plane defined by the two traces of the gauge through the tube, typically a horizontal plane, the plotted values of the traces are subtracted one from the other at each pair of diametrically opposed points examined along the length of the tube. A determination, by subtraction, of the difference in wall curvature values at diametrically opposite points is necessary to eliminate non-curvature effects, i.e., effects of tube diameter variations and of gravitational sag. Multiple pairs of opposed lines along the length of the tube may be investigated in like manner. For example, pairs of lines in two mutually perpendicular planes are needed to provide a complete representation of axial curvature in terms of axial curvature components in the two planes.

This multiple pass method, while accurate and reliable, is burdensome, time consuming and costly, owing to the multiple steps required in analyzing the data obtained from the gauge so as to yield a meaningful indication of the axial curvature along the length of a tube of interest. Were the wall curvature gauge truly to perform its supposed function, a description of the axial curvature behavior in a tube, such multiple steps of additional data analysis would not be necessary. Certainly, it does not serve that function.

Clearly, the provision of improved methods and apparatus for measuring the axial curvature of a tube accurately and reliably in real time in a simple, straightforward manner would be quite advantageous in the art of manufacturing certain types of tubes, such as those intended for use in millimeter waveguide systems.

SUMMARY OF THE INVENTION

An object of the invention resides in new and improved methods and apparatus for measuring the axial curvature of a tube or other elongated member.

The invention contemplates the provision of a compound gauge in the form of a single, rigid carrier which supports two or more wall curvature gauges arrayed equiangularly about the axis of the carrier. The compound gauge is displaced axially along a tube with the component gauges, if two in number, maintained in a common, horizontal plane. Radially movable probes on the gauges sense wall curvature values along longitudinally extending lines arrayed equiangularly about the axis of the tube on a wall surface of the tube, typically the inner wall of the tube. The gauges are supported on the carrier such that each gauge is substantially independent of the other, except for a correspondence in the axial locations of the gauges. Thus, the response of each gauge is affected only by the curvature of the tube wall in the immediate vicinity of the gauge.

A single, continuous electrical signal, having a voltage proportional to a weighted algebraic sum of the wall curvature values sensed by the probes as the compound gauge is advanced along the tube, is generated. This electrical signal is indicative of the pattern along the length of the tube of an axial curvature component in a reference plane defined relative to the angular positions of the gauges. For two gauges, the weighted algebraic sum is a difference between the gauge readings and the reference plane is the plane of the two gauges. By reorienting the tube with respect to the compound gauge, plural horizontal passes, for example, in two perpendicular axial planes, may be utilized to provide complete curvature information by defining the behavior of the curvature component in each of the planes. With this information, such parameters as the root mean square value, maxima and the periodic content of the axial curvature over the plural angular orientations may be observed.

BRIEF DESCRIPTION OF THE DRAWING

FIG. 1 of the drawing is a plan view, partly in section, of a compound gauge device for measuring the axial curvature of a tube in accordance with the principles of the invention, illustrating the compound gauge housed within a section of the tube;

FIG. 2 is a side elevational view of the section of the tube and the device of FIG. 1, showing additional aspects of the compound gauge device;

FIG. 5 is a schematic illustration of the individual and combined effects of axial curvature, diameter variations and sag on opposed inner wall surfaces of the tube in a horizontal, X-Z plane;

DETAILED DESCRIPTION

Figure 3:
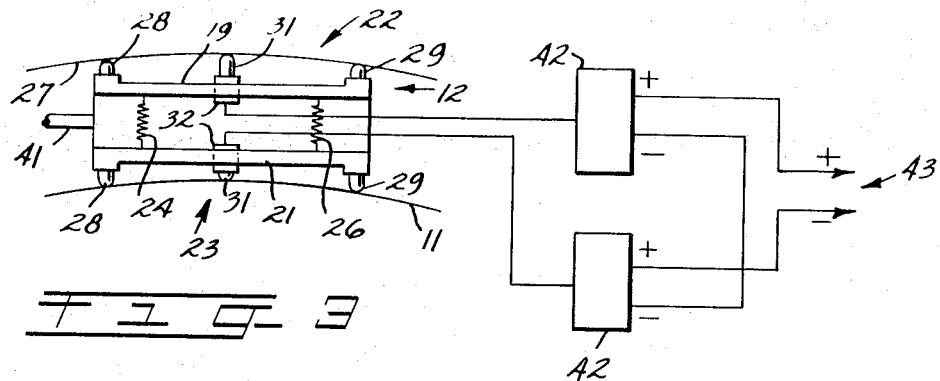
FIG. 3 is a schematic illustration of an electrical circuit for generating a single, continuous voltage signal indicative of the axial curvature of the tube being measured by the compound gauge.

Turning to FIGS. 1 through 3 of the drawing, a section of a tube 11 is illustrated. The tube, while typically of right circular cylindrical periphery, may have any shape, e.g., elliptical or even square, triangular, etc., and may be formed of any suitable material, e.g., steel. The tube is to be measured to obtain an accurate and reliable indication of axial curvature as a function of axial position along the length of the tube.

A compound gauge 12 for measuring axial curvature is shown positioned within the tube 11. The compound gauge includes a carrier frame, formed by two end members 13 and 14 interconnected by two tie rods 16 and 17. Each end member has a number of spring-loaded, radially extending plungers 18,18, which form bearing points for supporting the compound gauge 12 radially centered within the tube 11.

Two probe carrier bars 19 and 21, constituting the major structural members of two individual wall curvature measuring gauges 22 and 23, respectively, are supported substantially independently in diametrically opposed positions on the frame. Each bar 19 or 21 is adapted for movement in a radial direction. A pair of springs 24 and 26 force the bars 19 and 21 radially outwardly toward opposite sides of an inner wall surface 27 of the tube 11.

Two feet 28 and 29 form part of the probe carrier bar 19 or 21 of each gauge 22 or 23, one foot projecting radially outwardly adjacent to each end of the bar. A radially outermost tip of each foot 28 or 29 engages the inner wall 27 of the tube continuously, under the influence of the springs 24 and 26 on the bars 19 and 21.

A probe 31 is mounted on each bar in fixed position, e.g., centrally, with respect to the feet 28 and 29 on the bar, and is adapted for radial movement relative to the bar. The two probes are situated in a common radial plane, i.e., a plane intersecting the axis of the compound gauge 12 perpendicularly. Each probe 31 is coupled mechanically to a different one of a pair of conventional linear variable differential transformers (LVDT's) 32,32, the LVDT's each being mounted on a different bar 19 or 21. Each LVDT includes an internal biasing spring 33 which maintains a radially outermost tip of the associated probe 31 in continuous contact with one of a pair of diametrically opposed test points on the inner wall 27 of the tube. The LVDT's provide electrical signals having voltages which are indicative of the position of the tip of each probe 31 relative to a line between reference points defined by the tips of the feet 28 and 29 on the respective probe carrier bar 19 or 21. A cantilever arm 34 supports each probe 31 and LVDT 32 on the respective carrier bar 19 or 21 for radial adjustment through manipulation of an adjusting screw 36.

Figure 4:
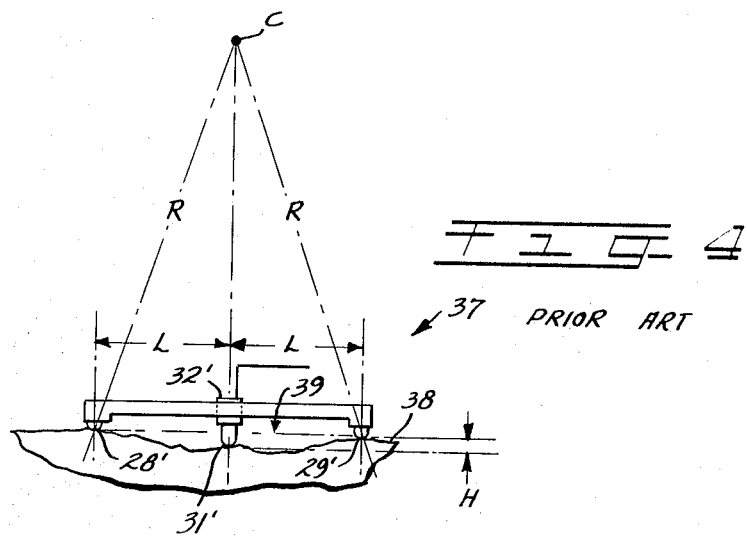
FIG. 4 is a schematic illustration of a prior art gauge for measuring wall curvature in a tube.

Each of the wall curvature gauges 22 and 23, as described thus far, corresponds generally to a wall curvature gauge 37 known in the prior art, as illustrated schematically in FIG. 4 of the drawing. In order to provide a better understanding of the present invention, the functioning of the prior art gauge will now be described with reference to the measurement of a curved wall surface 38 of a tube.

A reference line 39 is defined by the wall-engaging outer tips of two feet 28' and 29', one adjacent to each end of the wall curvature gauge 37. The tip of a probe 31', which may be positioned at any known longitudinal location between the feet 28' and 29', e.g., centrally as shown, engages a test point on the tube wall 38 displaced by a distance H from the reference line 39. Suitable means, such as an LVDT 32', are utilized to provide an indication of the magnitude of the distance H.

As illustrated in FIG. 4, a circle, having a center C and a radius R, may be defined through the three contact points provided by the gauge, namely the tips of the feet 28' and 29' and of the probe 31'. By geometry, the displacement of the probe from the reference line 39, already identified as the distance H, is directly proportional to the curvature $\rho$ of the circle. The curvature is, of course, the inverse of the radius R. With the probe 31' located centrally of the gauge 37, at a length L from each of the feet 28' and 29', there is established the relationship $$(R - H)^2 + L^2 = R^2 \tag{1}$$

or $$R = H^2 + L^2/2H. \tag{2}$$

Since the distance H is ordinarily quite small in comparison to the distance L, $$R \approx L^2/2H \tag{3}$$

or $$\rho = 1/R = 2H/L^2. \tag{4}$$

Thus, since the length L is known, the indication of the distance H provided by the gauge 37 constitutes a measure of the curvature $\rho$ of the tube wall 38 at the test point engaged by the tip of the probe 31' with reference to the points on the wall engaged by the tips of the feet 28' and 29'.

In similar manner, it may be shown that, for any known longitudinal location of the probe 31' on the gauge 37 intermediate the feet 28' and 29' at a spacing s from one of the feet 28' or 29' and with a distance d between the feet 28' and 29'

$$\rho = 2H/ds - s^2. \tag{5}$$

The foregoing discussion presupposes that the wavelength of any periodic variation in wall curvature is longer than the distance between the feet 28' and 29'. For shorter wavelengths, a correction is necessary, based upon the relative longitudinal position of the probe 31' with respect to the feet 28' and 29'. A gauge 37 of relatively short length is, thus, seen to be desirable to avoid any need for correction.

The reading provided by the LVDT 32' will now be considered in more detail. It was initially assumed that the behavior of the axial curvature of a tube in a plane would correspond to the behavior of the wall curvature indicated by the LVDT 32' in a single axial pass of the gauge 37 through the tube along such plane. A more complete analysis, however, indicates that the value of the displacement H at any position along the tube wall 38 is a function of several factors, such as axial curvature $H_A$ of the tube (FIG. 5), tube diameter variations $H_D$, and gravitational sag $H_S$ in the tube. It will next be demonstrated that plural passes of the single wall curvature gauge 37 through the tube are necessary to isolate the indication of axial curvature.

Figure 6:
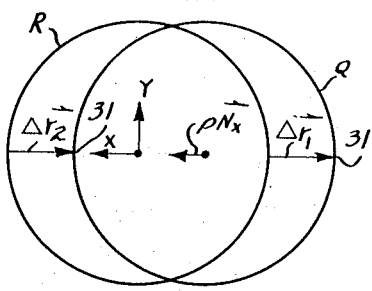
FIG. 6 is a schematic illustration of two spaced radial cross sections of a tube, the axial curvature of which is to be measured by a two-gauge device such as that shown in FIGS. 1 through 3.

Referring now to FIG. 6, which looks into the tube in the direction of the Z axis, it may be seen that, for a component of curvature in one plane, the X-Z plane in FIG. 6, and no other distortion, a tube cross section Q will be displaced with respect to a reference cross section R at a different axial location. In the plane of the displacement, the radial displacement may be observed to be positive, $\Delta \vec{r}_1$ on one side of the cross section Q and negative, $\Delta \vec{r}_2$, on the other, when measured with respect to the reference cross section R. It is possible to take advantage of this fact through the use of plural passes of the prior art wall curvature gauge 37 (FIG. 4) through the tube in the manner next described, the displacement H in FIG. 4 corresponding to the displacement $\Delta r_1$ in FIG. 6.

By displacing the wall curvature gauge 37 twice through the tube, with a 180° rotation of either the gauge or the tube between the two passes of the gauge through the tube, traces of the value of H may be taken along diametrically opposite inner wall surfaces 1 and 2 (FIG. 5) of the tube. The two traces are preferably taken in a horizontal X-Z plane so as to equalize gravitational sag effects on both surfaces. These traces may be plotted on a common chart.

As illustrated at the bottom of FIG. 5, diameter variation and sag effects on the value of $\Delta r$ occur in like radial direction along both opposed surfaces 1 and 2 in the horizontal plane. Meanwhile axial curvature effects provide readings of $\Delta r$ which occur in opposite radial directions for the two surfaces, as discussed previously. Thus, by taking the value of $\Delta r$ at a test point along surface 1 and subtracting the value of $\Delta r$ at a test point on diametrically opposed surface 2, i.e., $\Delta r_1 - \Delta r_2$, there may be obtained an indication of the component of axial curvature, at the two opposite test points investigated, in the plane of the two points. This indication is substantially free of diameter variation and sag effects and, thus, is directly proportional to a component of axial curvature in the horizontal plane. Two similar sets of readings in mutually perpendicular planes, providing indications of axial curvature components in the two planes, will furnish complete axial curvature information for tube characterization, as more fully set forth next.

Curvature is a vector function which describes the rate of change in the direction of an axis with respect to displacement along the axis. Employing mutually perpendicular X-Y-Z coordinates, and with the tube axis aligned as closely as possible with the Z axis, the exact location of the tube axis may be described as a function of z.

The vector location of the tube axis is $$\vec{R}(z) = x(z) \vec{i} + y(z) \vec{j} + z\vec{k}. \tag{6}$$

The unit tangent vector T(z) specifies the direction of the tube axis at position z, and is defined as $\vec{T}(z) \approx dx(z)/dz \, \vec{i} + dy(z)/dz \, \vec{j} + \vec{k}$.

Curvature, $\rho \vec{N}(z)$, is the rate of change of $\vec{T}(z)$ with respect to z and is perpendicular to $\vec{T}(z)$. The curvature $\rho \vec{N}(z)$ is $$\rho \vec{N}(z) = d^2x(z)/dz^2 \, \vec{i} + d^2y(z)/dz^2 \, \vec{j} \tag{8}$$

For the compound gauge 12 of the present invention $$d^2x(z)/dz^2 \, \vec{i} = k_2(\Delta \vec{r}_1 - \Delta \vec{r}_2)x \tag{9a}$$

and $$d^2y(z)/dz^2 \vec{j} = k_2(\Delta \vec{r}_1 - \Delta \vec{r}_2) y \quad (9b)$$

where $k_2$ is a proportionality factor and $\Delta \vec{r}_1$ and $\Delta \vec{r}_2$ are the radial displacements of the tips of the two probes 31,31, as shown in FIG. 6 of the drawing, taken in the X-Z and Y-Z planes in Equations (9a) and (9b), respectively.

It may be observed from Equation (8) that, in a precision tube, curvature has components in the X and Y directions, these components corresponding to the second derivatives of X and Y axis coordinates with respect to z. Thus, measurement of the curvature of a precision tube in the two, mutually perpendicular X-Z and Y-Z planes, as defined in Equations (9a) and (9b), yields a complete description of the axial behavior of the tube.

Returning now to the compound gauge 12 of the present invention, as illustrated in FIGS. 1-3, its operation will next be discussed. The compound gauge is located in the tube 11, e.g., adjacent to one end of the tube, with the two wall curvature gauges 22 and 23 oriented in a common, horizontal plane, as shown in FIG. 1. The tips of the probes 31, 31 engage a pair of initial test points on the inner wall 27 of the tube, the test points lying in a common, radial plane. The compound gauge is now advanced and/or retracted axially along the interior of the tube 11, e.g., by application of forces through a push-pull rod 41 (FIG. 3).

Electric voltage signals are provided by the LVDT's 32,32, associated with the two diametrically opposed wall curvature gauges 22 and 23, in similar manner to the operation of the LVDT 32' of the gauge 37, as the compound gauge 12 is displaced axially through the tube. The output signal provided by each LVDT 32 is independent of that provided by the other LVDT, due to the substantially independent mounting of the gauges 22 and 23 on the springs 24 and 26. The difference between the voltages of the two LVDT signals constitutes an indication of the pattern of axial curvature along the length of the tube in the horizontal plane.

Two signal conditioners 42,42, (FIG. 3) are coupled to the LVDT's 32,32 such that each signal conditioner receives the output signal from a different one of the LVDT's. The signal conditioners function to convert modulated, alternating current voltage signals from the LVDT's into direct current voltage signals which are proportional to the displacement of the probes 31,31 and which can be readily processed. As seen in FIG. 3, the outputs of the signal conditioners are coupled together differentially so as to provide a single, continuous electrical output signal at 43, corresponding to the difference in voltages of the signals from the two LVDT's 32,32, as the compound gauge 12 is advanced along the tube 11.

The voltage pattern provided by the single output signal at 43 constitutes a direct measure of the pattern along the tube of an axial curvature component in the horizontal plane of the probes 31,31. This is due to the fact that the voltage pattern follows the pattern of instantaneous differences between the voltage outputs from the two LVDT's 32,32 as the compound gauge 12 is displaced along the length of the tube, i.e., the pattern of differences in the wall curvatures along pairs of test points on diametrically opposite surfaces of the inner wall 27 of the tube. As previously explained with reference to FIGS. 5 and 6, the difference in wall curvature gauge readings along the diametrically opposed wall surfaces of a tube, the surfaces lying in a horizontal plane through the tube, is directly proportional to the component of axial curvature in the horizontal plane.

A rotation of the tube about its axis, so as to bring additional axial planes into a horizontal position, permits the taking of additional readings by the compound gauge 12. A plot of variations in the voltage of the signal axially of the tube, e.g., with traces taken for two axial planes through the tube, provides an easily analyzed, complete indication of the axial curvature pattern. Such typical characteristics as the root mean square value, maxima, minima and the periodic content of the axial curvature may either be read directly from the plot or determined with a minimum of effort.

It must be emphasized that the simplified, direct, real time plot of axial curvature along the tube can be obtained only by a simultaneous passing of the two wall curvature gauges through the tube along diametrically opposite tube wall surfaces, with the gauges mounted substantially independently of one another to eliminate any possibility of interdependent readings, while a continuous electrical signal representing wall curvature is generated by each of the gauges and while the two signals are combined so as to generate continuously a single output signal having a voltage proportional to the difference between two signals and, thus, to the magnitude of the axial curvature component in plane. Thus, the rapidity of data taking and analysis is enhanced both by the simultaneous obtaining of two wall curvature readings and by the instantaneous and automatic processing of the two wall curvature readings into meaningful information concerning axial curvature along the tube.

The discussion thus far assumes an absence of any effects from higher order, odd-foil distortions. An odd-foil distortion is a symmetrical distortion characterized by an odd number of lobes in a tube cross section, e.g., a trifoil distortion characterized by three lobes arrayed equiangularly about the axis of the tube. Axial offset or axial curvature may be understood as a first order odd-foil distortion in that, if the effect is observed, without interruption, throughout a 360° scan about the periphery of the inner wall of the tube, one cycle of curvature variation will be observed. For higher order odd foils, multiple cycles may be observed, if measurable.

It should be noted that even-foil distortions of any order and diameter variations will not affect the operation of the compound gauge 12. Even-foil distortions will be balanced out by a subtraction of values of $\Delta r$ taken along opposed wall surfaces of the tube, as in the manner already demonstrated for diameter variations.

Periodic odd-foil distortions, when viewed radially from the tube axis, may appear initially to constitute deviations in axial curvature. Upon further observation, however, they will be found to be periodic about the periphery of the tube. In some instances, these higher order odd-foil distortions may be ignored, inasmuch as they are generally much less pronounced than those caused by variations in axial curvature. Such higher order odd-foil distortions may, however, be significant in such fields as millimeter waveguide transmission, or where cylinders of a desired odd-foil geometry, e.g., triangular or pentagonal, are involved. Techniques for measuring axial curvature in a tube, with higher order odd-foil effects eliminated, are available through the use of compound gauges of the type of the invention.

In similar manner to the use of the compound gauge device 12 employing two gauges to eliminate the effects on axial curvature examination of even-foil distortions, compound gauge devices employing an odd number of gauges may be utilized to eliminate the effects of higher order odd-foil distortions from the axial curvature measurement. Each such compound device is identical to the compound gauge device 12 in all respects other than the number of probe carrier bars mounted independently at equiangular spacings about the axis of the device. Any trifoil distortions may be eliminated from the axial curvature measurement through the use of a three gauge device, five-foil distortions by a five gauge device, etc.

The manner of operation of a three gauge device to provide direct readings of an axial curvature component in a plane independent of any trifoil distortion effects will now be briefly described. This operation is considered exemplary of the use of a multiple gauge device for examining axial curvature without encountering higher order odd-foil effects.

Figure 7:
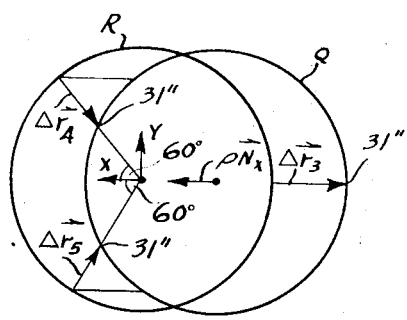
FIG. 7 is a schematic illustration similar to that of FIG. 6 where measurement is to be made by an alternative, three-gauge device.

Turning to FIG. 7, a figure similar to FIG. 6, it is observed once again that axial curvature in a horizontal X-Z plane offsets a tube cross section Q with respect to a reference cross section R at a different axial location. One of three equiangularly arrayed wall curvature gauges is taken as located in the X-Z plane. This assumption, convenient for purposes of analysis, does not affect the validity of the analysis so long as readings are taken in two mutually perpendicular planes.

Since any trifoil distortion effects are equal and in like radial direction for all of the gauges, only axial curvature effects are noted when a weighted algebraic sum is determined for the voltages of the output signals provided by the three gauges. This weighted algebraic sum, determined in a manner next to be described, in directly proportional to an axial curvature component in the X-Z plane.

As seen in FIG. 7, the radial direction of the displacement $\Delta \vec{r}_3$ sensed by the tip of a probe 31" of the gauge located in the X-Z plane is opposite to the radial direction of the X-Z plane components of the displacements $\Delta \vec{r}_4$ and $\Delta \vec{r}_5$ sensed by the tips of probes 31",31" of the other two gauges. The X component of displacements sensed by the latter two gauges are observed each to be one-half of the total displacement sensed $\Delta \vec{r}_4$ or $\Delta \vec{r}_5$, since each of these two gauges is disposed at a 60° angle to the X-Z plane, which passes midway between the two gauges. Thus, the weighted average sum for the three gauge compound device, i.e., the proportionality factor varying directly with the X-Z plane component of axial curvature, corresponds to the difference between the reading of the gauge located in the X-Z plane and one-half the sum of the readings of the two gauges. The curvature equation, which parallels Equations (8), (9 a) and (9b) for the two probe device 12, is $$\rho \vec{N} = k_3 (\Delta \vec{r}_3 - 1/2\Delta \vec{r}_4 - 1/2\Delta \vec{r}_5)$$

(10)

where $k$ is a fixed proportionaltiy factor; $\Delta \vec{r}_3$, $\Delta \vec{r}_4$, and $\Delta \vec{r}_5$ are the respective radial displacements illustrated in FIG. 7; and respective weighting factors of +1, −1/2, and −1/2 are used to determine the weighted algebraic sum shown in parentheses at the right side of Equation (10).

The use of the weighted algebraic sum just discussed parallels the use as a curvature component indicator of the difference between the readings of the two gauges of the compound device 12 described previously. This difference between the readings of the two gauges constitutes a weighted algebraic sum for the two gauge device. Looking again at Equations (9a) and (9b), the weighted algebraic sum $k_2(\Delta \vec{r}_1 - \Delta \vec{r}_2)$ includes weighting factors of +1 and −1 for the respective radial displacements $\Delta \vec{r}_1$ and $\Delta \vec{r}_2$ (FIG. 6). In similar manner, weighted algebraic sum equations may be determined for five gauge devices, seven gauge devices, etc. A family of such compound gauge devices may be employed to examine axial curvature in the absence of effects of distortions of various types which may be considered significant.

It is to be understood that the described compound gauges and methods are simply illustrative of certain embodiments of the invention. Alternative compound gauge devices might utilize common rigid carriers to mount independently two or more wall curvature gauges along diametrically opposed exterior surfaces of each tube being tested, in order to explore axial curvature with reference to an outer wall of the tube, rather than the inner wall. Moreover, where exterior surfaces are to be utilized, the elongated member to be tested need not be hollow, but may instead be in the form of a solid cylinder, right circular or otherwise. Many other modifications may be made in accordance with the principles of the invention.

What is claimed is:

1. In a method of measuring the axial curvature of an elongated member:
   a. sensing the wall curvature simultaneously and independently at a number of test points on a wall surface of the elongated member, the test points being arrayed equiangularly about the axis of the elongated member in a common, radially extending plane; while
   b. indicating a planar component of the axial curvature of the elongated member at the test points as a weighted algebraic sum of the individual wall curvature values sensed at the test points.

2. In the method of claim 1, said step (b) comprising: generating an electrical signal having a voltage proportional to said weighted algebraic sum of the individual wall curvature values sensed at the test points.

3. In the method of claim 1, said steps (a) and (b) respectively comprising:
   sensing the wall curvature at two test points at diametrically opposed positions on the wall surface of the elongated member; and
   indicating the differences between the individual wall curvature values sensed at the two test points, said difference being proprotional to a component of the axial curvature of the elongated member, at the test points, in an axial plane which includes the test points.

4. In the method of claim 1, the elongated member being a tube and said wall surface being an inner wall of the tube.

5. In a method of measuring the axial curvature of an elongated member, the steps of:

a. sensing the wall curvature independently at a number of initial test points on a wall surface of the elongated member, the initial test points being located in a common, radially extending test plane intersecting the axis of the elongated member perpendicularly, the initial test points being arrayed equiangularly about the axis of the elongated member; while b. indicating a planar component of the axial curvature of the elongated member at said initial test points as a weighted algebraic sum of the individual wall curvature values sensed at the test points; and then c. repeating steps (a) and (b) for a plurality of further radially extending test planes intersecting the axis of the elongated member perpendicularly at at least several further positions along the axis, the number of additional test points on the wall surface of the elongated member being examined in each of said further radially extending test planes corresponding to said number of initial test points, the additional test points and the initial test points describing a number of equiangularly arrayed, axially extending lines on the wall surface of the elongated member, the number of said lines corresponding to said number of initial test points.

6. In the method of claim 5, said step (b) comprising:
generating an electrical signal having a voltage proportional to said weighted algebraic sum of the individual wall curvatures sensed at the initial test points.

7. In the method of claim 5, the elongated member being a tube, said step (a) comprising:
sensing the wall curvature at a number of initial test points situated on an inner wall of the tube.

8. In the method of claim 5, said step (a) comprising:
sensing the wall curvature at two initial test points at diametrically opposed positions on the wall surface of the elongated member.

9. In the method of claim 8, said step (b) comprising:
indicating the difference between the individual wall curvature values sensed at the two initial test points, said difference being proportional to a component of the axial curvature of the elongated member, at the initial test points, in an axial plane which includes the initial test points.

10. In the method of claim 5, said step (a) comprising:
sensing the wall curvature at three initial test points arrayed equiangularly about the axis of the elongated member.

11. In the method of claim 10, said step (b) comprising:
indicating the difference between the individual wall curvature value sensed at one of the initial test points and one half the sum of the individual wall curvature values sensed at the other two initial test points, said difference being proportional to a component of the axial curvature of the elongated member, at the initial test points, in an axial plane which includes said one initial test point and passes midway between said other two initial test points.

12. In a method of measuring the axial curvature of an elongated member, the steps of:
a. sensing the wall curvature at a first test point on a wall surface of the elongated member; while simultaneously b. sensing the wall curvature at a second test point on the wall surface of the elongated member, the second test point lying diametrically opposite the first test point, sensing steps (a) and (b) being independent of one another; and while c. indicating the difference in wall curvature values sensed for the first and second test points, said difference corresponding to a component of the axial curvature of the elongated member, at said first and second test points, in an axial plane which includes the first and second test points; and then d. repeating steps (a) through (c) at a plurality of additional locations along the length of the elongated member constituting, with the first and second test points, a succession of first test points lying along a first axially extending path and a succession of second test points lying along a second, diametrically opposed, axially extending path, thereby indicating an axial pattern of said difference along the first and second axially extending paths.

13. In the method of claim 12, said step (c) comprising:
generating an electrical signal having a voltage proportional to said difference in sensed wall curvature values.

14. In the method of claim 12, the elongated member being a tube, said sensing steps (a) and (b) each comprising:
sensing the wall curvature at a test point situated on an inner wall of the tube.

15. In the method of claim 12:
repeating steps (a) through (d) in at least one additional, axially extending test plane differing from an axially extending test plane defined by said first and second axially extending paths.

16. In the method of claim 15, said axially extending test planes being two, mutually perpendicular, axially extending test planes.

17. In a method of measuring the axial curvature of an elongated member, the steps of:
a. sensing the radial displacement of a first test point, situated on a wall surface of the elongated member, relative to a first axially extendng reference line joining two reference points on said wall surface spaced at known distances from said first test point at axially opposite sides of the first test point; while simultaneously b. sensing the radial displacement of a second test point, situated diametrically opposite said first test point on the wall surface of the elongated member, relative to a second axially extending reference line joining two additional reference points on the wall surface spaced at corresponding known distances from said second test point at axially opposite sides of the second test point, sensing steps (a) and (b) being independent of one another; and while c. generating an electrical signal having a voltage proportional to the difference in radial displacements sensed for said first and second test points so as to indicate the magnitude of said difference; and then d. repeating steps (a) through (c) at a plurality of additional locations along the length of the elongated member constituting, with said first and second test points, a succession of first test points lying along a first axially extending path and a succession of second test points lying along a second, diametrically opposed, axially extending path, thereby indicating an axial pattern of said difference along said first and second axially extending paths.

18. In the method of claim 17, the elongated member being a tube, said sensing steps each comprising:
sensing the relative radial position of a test point situated on the inner wall of the tube.

19. In a device for measuring the axial curvature of a elongated member:
a carrier;
a number of means, supported by the carrier, for each, independently of the other means, sensing the wall curvature at a different one of a corresponding number of test points on a wall surface of the elongated member, the test points lying in a common, radially extending test plane perpendicularly intersecting the axis of the elongated member and being arrayed equiangularly about the axis of the elongated member;
means for indicating a planar component of the axial curvature of the elongated member at said test points as a weighted algebraic sum of the individual wall curvature values sensed by the independent wall curvature sensing means; and
means for moving the carrier axially along the elongated member.

20. In the device of claim 19, said indicating means comprising:
means for generating an electrical signal having a voltage proportional to said weighted algebraic sum of the individual wall curvature sensed by the independent sensing means.

21. In the device of claim 19, wherein the elongated member is a tube and wherein said wall surface constitutes the inner wall of the tube, said carrier moving means comprising:
means for advancing the carrier and the independent sensing means axially along the interior of the tube.

22. In the device of claim 19, said number of sensing means being two, the two sensing means being so positioned on the carrier as to sense the wall curvature at two test points at diametrically opposite locations on the wall surface of the elongated member.

23. In the device of claim 22, said indicating means comprising:
means for indicating the difference between the individual wall curvature values sensed by the two sensing means, said difference being proportional to a component of the axial curvature of the elongated member, at the test points, in an axial plane which includes the test points.

24. In the device of claim 19, said number of sensing means being three, the three sensing means being so positioned on the carrier as to sense the wall curvature at three test points arrayed equiangularly about the axis of the elongated member.

25. In the device of claim 24, said indicating means comprising:
means for indicating the difference between the wall curvature value sensed by the sensing means at one of the three test points and one half the sum of the individual wall curvatures sensed by the two sensing means at the other two test points, said difference being proportional to a component of the axial curvature of the elongated member, at the test points, in an axial plane which includes said one test point and passes midway between said other two test points.

26. In a device for measuring the axial curvature of an elongated member:
a carrier;
first means, supported by the carrier, for sensing the wall curvature at a first test point on a wall surface of the elongated member;
second means, supported by the carrier independently of the first sensing means, for sensing the wall curvature at a second point on the wall surface of the elongated member lying diametrically opposite the first test point;
means for indicating the difference in wall curvatures sensed by the first and second sensing means, said difference corresponding to a component of the axial curvature of the elongated member, at said first and second test points, in an axial plane which includes the first and second test points; and
means for moving the carrier axially along the elongated member.

27. In the device of claim 26, said indicating means comprising:
means for generating an electrical signal having a voltage proportional to said difference in sensed wall curvature values.

28. In the device of claim 26, wherein the elongated member is a tube and wherein said wall surface constitutes the inner wall surface of the tube, said carrier moving means comprising:
means for advancing the carrier and the first and second sensing means axially along the interior of the tube.

29. In a device for measuring the axial curvature of an elongated member:
a carrier;
first probe means, supported by the carrier, for sensing the radial displacement of a first test point, situated on a wall surface of the elongated member, relative to a first axially extending reference line joining two reference points on the wall surface spaced at known distances from said first test point at axially opposite sides of the first test point;
second probe means, supported by the carrier independently of said first probe means, for sensing the radial displacement of a second test point, situated diametrically opposite said first test point on the wall surface of the elongated member, relative to a second axially extending reference line joining two additional reference points on the wall surface spaced at corresponding known distances from said second test point at axially opposite sides of the second test point;
means for indicating the difference in radial displacements sensed by the first and second probe means; and
means for moving the carrier axially along the elongated member.

30. In the device of claim 29, said indicating means comprising:
means for generating an electrical signal having a voltage proportional to the difference in radial displacements sensed by the first and second probe means.

31. In the device of claim 29, wherein the elongated member is a tube and wherein said wall surface constitutes the inner wall surface of the tube, said carrier moving means comprising:

means for advancing the carrier and the first and second probe means axially along the interior of the tube.

32. In the device of claim 31, the carrier comprising:
biasing means for urging each of said first and second probe means radially outward toward the inner wall surface of the tube.

33. In the device of claim 31, the carrier comprising:
a first subcarrier mounting said first probe means,
a second subcarrier supported substantially independently from said first subcarrier and mounting said second probe means, and
means for biasing the first and second subcarriers diametrically apart.

34. In the device of claim 33, the carrier comprising:
a pair of first feet projecting radially outwardly from the first subcarrier, the first feet positioned such that, due to the effect of said biasing means on the first subcarrier, a radially outermost tip of each first foot contacts a different one of said reference points on the first axially extending reference line; and
a pair of second feet projecting radially outwardly from the second subcarrier, the second feet positioned such that, due to the urging of said biasing means on the second subcarrier, a radially outermost tip of each second foot contacts a different one of said additional reference points on the second axially extending reference line.

35. A device for measuring the axial curvature of a tube, which device comprises:
a carrier frame having a longitudinal axis;
a plurality of radially projecting means, comprising two sets of spring-loaded plungers, the plungers of each set being equiangularly arrayed about an axis of the carrier frame with one set adjacent to each end of the carrier frame, for supporting the carrier frame within the tube coaxially with the tube;
first and second axially extending bars mounted independently of one another in diametrically opposed positions on the carrier frame;
means supported by the carrier frame for biasing said bars diametrically apart;
a pair of radially extending feet on each bar, one foot of each pair positioned adjacent to each axial end of the associated bar, for contacting adjacent reference points on an inner wall of the tube, the contacted reference points defining first and second reference lines adjacent to said first and second bars, respectively;
a pair of probes, one on each bar, each probe located in a fixed longitudinal position between the feet on its respective bar;
means for biasing each of the probes radially outwardly so as each to engage an adjacent test point at one of two diametrically opposed locations on the inner wall of the tube;
means for displacing the carrier frame, and with it the bars and the probes, axially through the tube; and
means for generating an electrical signal having a voltage proportional to the instantaneous difference in the radial displacements of the first and second probes relative to said first and second diametrically opposed reference lines, respectively.

* * * * *

UNITED STATES PATENT OFFICE
CERTIFICATE OF CORRECTION

Patent No. 3,780,442    Dated December 25, 1973

Inventor(s) WILLIAM MILAN GRESHO

It is certified that error appears in the above-identified patent and that said Letters Patent are hereby corrected as shown below:

In the specification, Column 1, line 9, "data" should read --date--; lines 25-26, "minimal," should read --minimal.--; line 34, "secon" should read --section--. Column 6, lines 53-54, the equation should be set out on one line and numbered --(7)--. Column 9, line 39, "described, in" should read --described, is--.

In the claims, Column 10, line 59, "proprotional" should read --proportional--.

Signed and sealed this 30th day of July 1974.

(SEAL)
Attest:

McCOY M. GIBSON, JR.
Attesting Officer

C. MARSHALL DANN
Commissioner of Patents